United States Patent [19]
Berg

[11] 3,720,418
[45] March 13, 1973

[54] SEAL ASSEMBLY AND METHOD FOR MAKING SAME

[75] Inventor: Lawrance F. Berg, Lockport, Ill.

[73] Assignee: Caterpillar Tractor Co., Peoria, Ill.

[22] Filed: March 29, 1971

[21] Appl. No.: 128,820

[52] U.S. Cl. .......................277/9, 277/24, 277/187, 277/189, 277/DIG. 10, 29/413
[51] Int. Cl. ............................F16j 15/00, F16j 15/16
[58] Field of Search.......277/9, 11, 24, DIG. 10, 187, 277/63, 35, 189; 29/413

[56] References Cited

UNITED STATES PATENTS

| 3,545,771 | 12/1970 | Downing | 277/187 |
| 2,448,147 | 8/1948 | Jacobsen | 277/10 |

FOREIGN PATENTS OR APPLICATIONS

| 475,456 | 3/1928 | Germany | 277/DIG 10 |
| 1,909,530 | 9/1970 | Germany | 277/24 |

*Primary Examiner*—Samuel B. Rothberg
*Attorney*—Fryer, Tjensvold, Feix, Phillips & Lempio

[57] ABSTRACT

A seal assembly, located in a seat provided in a housing or end cap of a hydraulic motor, for example, comprises an elastomeric seal member and a rigid, ring-like retaining member. The seal assembly serves a wiper function to clean a rod reciprocally movable through a bore in the housing or end cap. The elastomeric member is split in one place for easy placement around the rod and the retaining member is fractured into two or more pieces for easy placement around the elastomeric member and the rod. The retaining member includes means for easy removal of the seal assembly from the housing when it is replaced.

8 Claims, 3 Drawing Figures

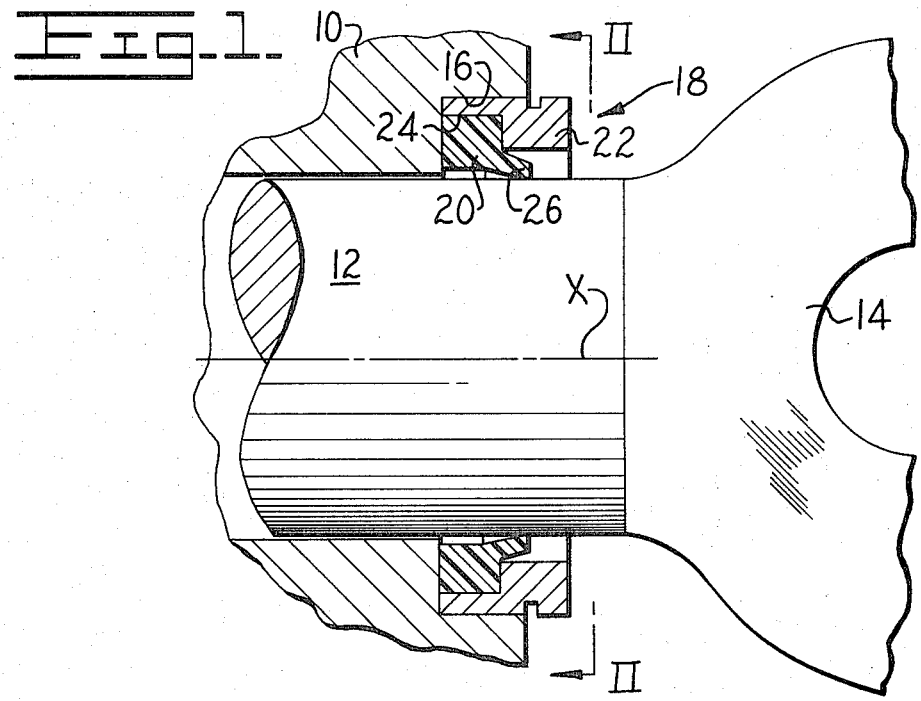
Fig. 1.
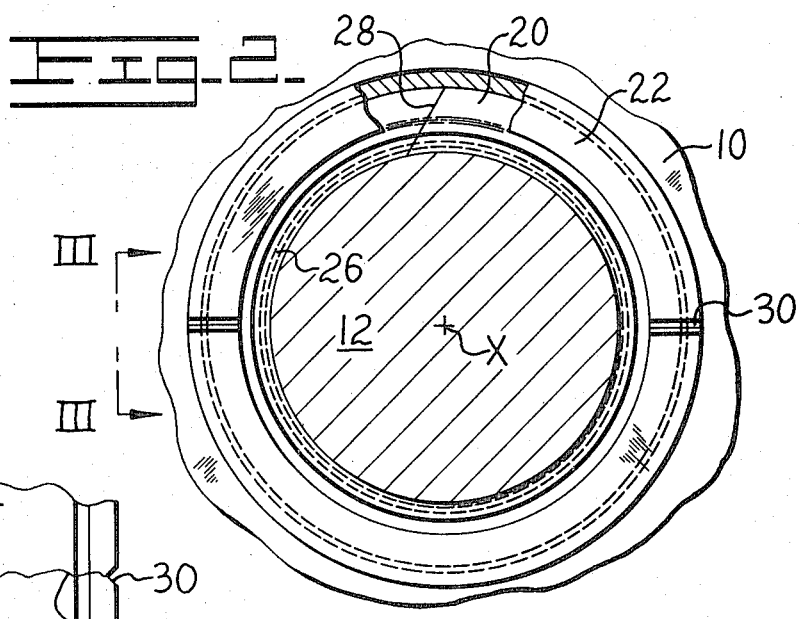
Fig. 2.
Fig. 3.
INVENTOR
LAWRANCE F. BERG 3,720,418

SEAL ASSEMBLY AND METHOD FOR MAKING SAME

BACKGROUND OF THE INVENTION

This invention relates to a seal assembly and method for making same wherein the seal is particularly adapted to clean the surface of a reciprocating rod, such as that used in a linear hydraulic motor or similar structure. The seal assembly is made up of an elastomeric member held in sealing contact with the rod by a retaining member. Both members are split so that the seal assembly can be expeditiously replaced without completely dismantling the motor, thus preventing interruption of valuable operating time of a machine equipped with one or more motors.

Wiper seals are utilized in linear hydraulic motors to clean the reciprocating rod of dust and other foreign particles. Machines equipped with such motors may be used in steel mill operations, for example, where exposure to excessive heat and foreign particles deteriorates the wiper seals rapidly. Such deterioration or failure will allow ingress of dirt into the motor which will damage the piston seals, scratch the smooth surface of the bore, and contaminate the hydraulic fluid used to actuate the hydraulic motor, thus possibly damaging other hydraulic components.

Many conventional motors must be completely dismantled to replace a seal, thus interrupting the valuable operating time of the machine. One solution to the problem of preventing expensive machine downtime when a seal failure of the above nature occurs is to provide a seal assembly that does not require dismantling of the hydraulic motor for replacement of the seal assembly. Many proposals have been made for alleviating this problem. Most of such prior art designs, however, are less than satisfactory in accomplishing the desired results.

SUMMARY AND OBJECTS OF THE INVENTION

The primary object of the present invention is to provide a seal assembly that is easy to install and easy to replace without completely dismantling the hydraulic component utilizing such seal assembly, such as a linear hydraulic motor.

Another object of this invention is to provide a seal assembly that can be easily and quickly replaced when necessary without causing expensive downtime of a machine.

A further object of this invention is to provide a method for making such a seal assembly.

DESCRIPTION OF THE DRAWINGS

Other objects of this invention will become apparent from the following description and accompanying drawing wherein:

FIG. 1 is a fragmentary cross sectional view of the seal assembly installed in the housing of a linear hydraulic motor and containing a length of rod shown in elevation;

FIG. 2 is an end view taken in the direction of arrows II—II in FIG. 1, with the seal assembly retaining member partially broken away to expose the circumferentially abutting surfaces of the elastomeric member; and FIG. 3 is a fragmentary view of the retaining member, taken in the direction of arrows III—III in FIG. 2, and further illustrating a fracturing force F.

DESCRIPTION OF THE DISCLOSURE

Referring now to the drawing, and more particularly to FIG. 1, there is illustrated a seal assembly embodiment of the present invention used in a hydraulic motor comprising a cylindrical housing 10 having a rod 12 reciprocally mounted therein. The housing and rod are essential elements of a conventional linear hydraulic motor. Generally, the rod has an eye portion 14 integrally formed on one end thereof to connect the rod to a work implement, while the other end is fitted with a piston (not shown) securely fastened thereto. Most often, the illustrated portion of housing 10 will constitute an end cap adapted to form an integral part of the motor's housing. The piston is held captive in the housing and may be selectively reciprocated therein by introduction of pressurized fluid into either end of the hydraulic motor.

The housing has an annular seat 16 internally formed thereon wherein an annular wiper seal assembly, shown generally at 18, is disposed on a central longitudinal axis X thereof. The seal assembly may be retained in its seat 16 by any suitable means and preferably by a press or interference fit with the seat. The seal assembly surrounds the rod member and comprises an annular, elastomeric seal member 20 and an annular, rigid retaining member 22.

The elastomeric member snugly fits into an annular recess 24 formed internally on the retaining member to position and hold a square shoulder portion of the elastomeric seal member to position a flexible lip 26 thereof in circumferential sealing contact with the outer surface of rod 12. As suggested above, the seal assembly is preferable secured in the housing by a press or interference fit between the outer surface of retaining member 22 and the inner, abutting surface of seat 16. The retaining member has a circumferential groove 28 formed thereon to provide means to remove the seal assembly from the housing upon deterioration or failure of elastomeric member 20, by the use of a prybar, crowbar or other similar tool.

It should be particularly noted in FIG. 2 that the elastomeric seal member preferably has a circumferentially angled split 28, disposed in a plane parallel and non-intersecting relative to axis X, which allows the member to be placed around rod 12 without the tedious procedure of dismantling the hydraulic motor. Recess 24 of retaining ring 22 holds the abutting surfaces of split 28 tightly together to prevent leakage therethrough. The retaining ring is adapted to be placed around the elastomeric member and rod without dismantling the hydraulic motor.

A fracturing method is preferably utilized to provide a retaining ring of two or more pieces. The fracture is accomplished by forming two or more notches 30 in one face of the retaining member 22, "backing-up" the one face and sharply striking the opposite face with a heavy object, illustrated by force F in FIG. 3, to cause a fractured separation means at 32 through the stress concentrations in the notched areas. This fracturing method will assure a tight fit at fracture 32 and prevent the loss of material and resultant decrease in size of the retaining member, such as would occur if a sawing or other machining operation was performed to provide the two or more piece construction. Such method will also provide a true cylindrical shape and a close fit at fracture 32 of the retaining member for precise placement in seat 16. The metallic material composing member 22, of course, may be selected from the group of materials well known to those skilled in the art. The material, such as mottled cast iron, should be suitably composed and heat-treated to exhibit sufficient brittleness and related physical and chemical characteristics to fracture in the manner described.

What is claimed is:

1. A seal assembly, disposed on a central longitudinal axis thereof, comprising
    an annular, elastomeric seal member,
    an annular, rigid retaining member, composed of a fracturable material, circumferentially surrounding and abutting said seal member, and
    the circumferential continuity of said retaining member solely being interrupted by at least two fractured separation means formed through said retaining member for permitting removal thereof radially outwardly from said seal member, each of said separation means constituting a close fitting and uninterrupted fracture disposed to extend longitudinally completely through said retaining member and terminating at at least one longitudinal end thereof at a notch means formed on an end of said retaining member.

2. The invention of claim 1 wherein two of said fractured separation means are formed through said retaining member at diametrically opposed locations thereon.

3. The invention of claim 1 wherein said retaining member has means forming an annular recess internally thereon, said seal member having a square shoulder portion mounted in said recess.

4. The invention of claim 3 wherein said seal member further comprises a flexible lip secured to said square shoulder portion and extending generally in the direction of said longitudinal axis.

5. The invention of claim 1 further comprising means forming a single, circumferentially angled split through said seal member.

6. The invention of claim 5 wherein said split is disposed in a plane which is in parallel and non-intersecting relationship relative to said longitudinal axis.

7. The invention of claim 1 further comprising means forming a circumferential groove on the periphery of said retaining member adapted to have a tool engage therewith to remove said seal assembly from an integrated assembly.

8. The invention of claim 1 further comprising a hydraulically actuated motor comprising a cylindrical housing having a rod reciprocally mounted therein and means forming an annular recess on said housing, said seal assembly mounted in said recess to have said retaining member urge said seal member into circumferential engagement with said rod.

* * * * *